(No Model.)
T. CRANEY.
ELECTROLYTIC APPARATUS.
No. 498,768. Patented June 6, 1893.
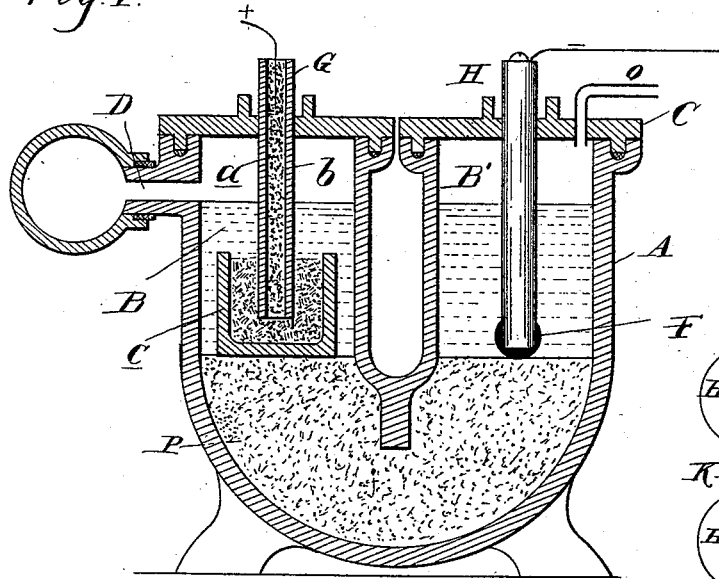
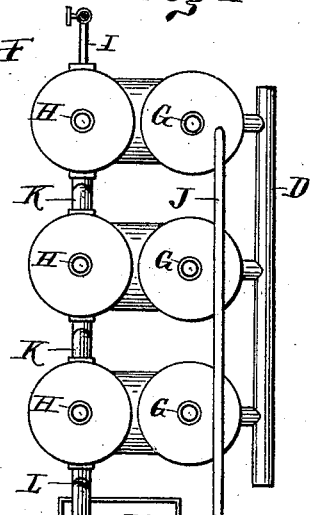
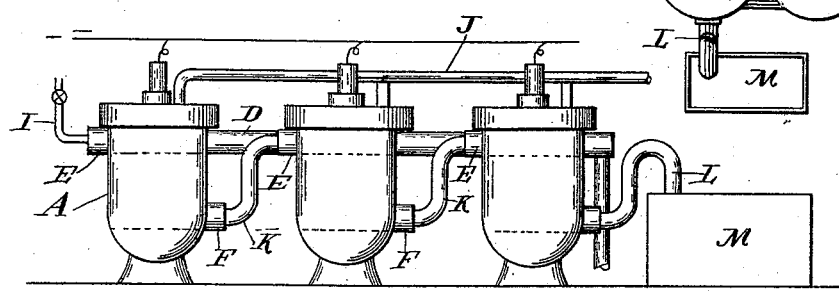
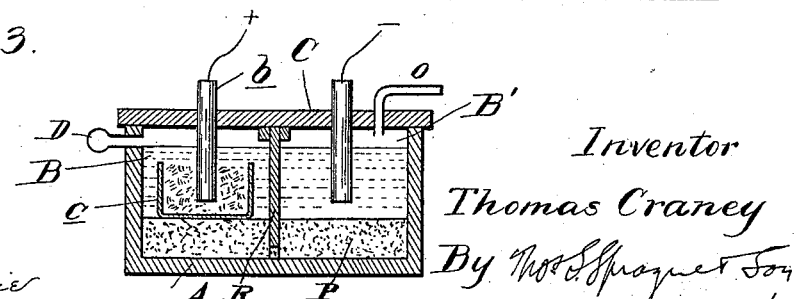
Witnesses
A. L. Hobbie
M. B. O. Dogherty
Inventor
Thomas Craney
By Thos. L. Sprague & Son
Atty's.

UNITED STATES PATENT OFFICE.

THOMAS CRANEY, OF BAY CITY, MICHIGAN.

ELECTROLYTIC APPARATUS.

SPECIFICATION forming part of Letters Patent No. 498,768, dated June 6, 1893.

Application filed March 25, 1892. Serial No. 426,393. (No model.)

*To all whom it may concern:*

Be it known that I, THOMAS CRANEY, a citizen of the United States, residing at Bay City, in the county of Bay and State of Michigan, have invented certain new and useful Improvements in Electrolytic Apparatus, of which the following is a specification, reference being had therein to the accompanying drawings.

This invention relates to new and useful improvements in electrolytic apparatus, principally designed for the decomposition of metallic salts, and the invention consists more specifically in the peculiar construction and arrangement of the electrolytic vessel, whereby the same is provided in a simple and economical manner with an efficient diaphragm, effecting in connection with the peculiar shape of the vessel a complete separation of the products of electrolysis and at the same time facilitating their ultimate separation and collection.

In the drawings, Figure 1 is a vertical, central section through a single vessel embodying my improvement. Fig. 2 shows an elevation of several united in series for joint operation. Fig. 3 is a section of a modified form of construction. Fig. 4 is a plan view of Fig. 2.

In describing my apparatus I will refer to it as applied and constructed for the purpose of decomposing chloride of sodium in the form of salt brine, for the manufacture of sodic hydrate on a commercial scale.

The material of which I construct my vessel is preferably stone or glass ware of any of the various kinds manufactured, the so-called vitrified stone ware being the most available. As a suitable form and one which embodies the principle of my construction, I choose the one shown at A in the drawings and which is substantially U-shaped in cross-section, forming two separate compartments communicating with each other at or near the bottom only; each compartment is provided with a cover C suitably constructed to form a tight joint. One of the compartments B forms the anode chamber and the other compartment B' forms the cathode chamber and one or more suitable anodes and cathodes G and H are provided for the two chambers respectively, and sealed in the cover. The anode chamber B is provided with an overflow D and the cathode chamber with an inlet opening E through which the solution to be decomposed is introduced, an exit opening F, through which the contents may be drawn off and a pipe O for the escape of gaseous products. This vessel I fill at the bottom with a powdered or comminuted substance P, such as a solid body of the salt to be decomposed, powdered slate, glass, asbestus fiber or other indestructible material, which is adapted to form a porous medium between the compartments. Upon this porous bottom at one side the anode may be supported, as shown in Fig. 1, and may consist of a body of carbon *a* contained in the tube *b* and cup *c*, as heretofore described and shown by me in Letters Patent No. 482,724, dated September 20, 1892, or of other suitable form.

In practice it will be seen that if the two compartments are filled with the solution of chloride of sodium up to the height of the overflow and the current applied, electrolytic action is free to take place between the two compartments and chlorine will be liberated on the side at the anode and pass out through the overflow D, while sodic hydrate is formed in the chamber B' and may be removed therefrom from time to time. A continuous feed may be provided and the liquid circulated through a series of vessels by means of a feed pipe I leading into the first cathode compartment and a feed pipe J provided with separate connections into each anode compartment and connecting the compartments containing the cathodes in the manner shown in Fig. 2, by means of pipes K and by a pipe L from the last cathode compartment into a receiver M.

My invention overcomes certain difficulties heretofore encountered in the construction of electrolytical apparatus. In the employment of so-called electrolytic diaphragms forming vertical partitions it was always impossible to maintain their integrity for any length of time as disintegration ensued rapidly and caused them to crumble and break down. This I have entirely overcome by using the porous bottom through which the two compartments electrolytically communicate. This arrangement not only insures an indestructible partition between the two compartments, but it effectually separates the products of decomposition of electrolysis, as it will be seen that the chlorine gas formed in the anode compartment is compelled by its specific gravity to travel in a direction entirely opposite to what it would have to go, to reunite with the sodic hydrate. The hydrogen which forms on the cathode side, by the same laws of gravity is forced to collect in the compartment B' from which it may be conducted off through a pipe H leading into a common discharge pipe H'.

In Fig. 3, I show a simple modification of my invention which consists in forming the vessel of rectangular shape divided by a partition strip R into two compartments. This construction may be of wood covered with a suitable protecting substance where necessary.

While I desire to avail myself of different materials for the porous medium, I want to distinctly claim the use of crystals of the salt to be decomposed as available for the purpose, and I am not aware that an electrolytic diaphragm has ever been used heretofore which was wholly or partly composed of the solid body of the substance to be electrolized.

What I claim as my invention is—

1. In an electrolytic apparatus, the combination of a series of electrolytic cells containing the liquid to be electrolyzed and each divided into two compartments communicating with each other through a porous medium at or near the bottom thereof, an anode and cathode inclosed in said compartments respectively, and feed and discharge connections into and from the cathode compartments of the cells, connecting them in series to provide for a flow of the liquid through the compartments, substantially as described.

2. In an electrolytic apparatus, the combination with an anode and cathode contained in separate compartments communicating with each other at or near the bottom, of a porous medium forming an electrolytic diaphragm on the bottom between said compartments and composed wholly or partly of a solid body of the salt to be electrolyzed in the solution contained in the compartments, substantially as described.

In testimony whereof I affix my signature in presence of two witnesses.

THOMAS CRANEY.

Witnesses:
M. B. O'Dogherty,
N. L. Lindop.